(12) United States Patent
Saitoh et al.

(10) Patent No.: US 10,747,057 B2
(45) Date of Patent: Aug. 18, 2020

(54) DISPLAY DEVICE

(71) Applicant: FUJIFILM Corporation, Tokyo (JP)

(72) Inventors: Yukito Saitoh, Kanagawa (JP); Naoyoshi Yamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/696,137

(22) Filed: Nov. 26, 2019

(65) Prior Publication Data

US 2020/0096803 A1 Mar. 26, 2020

Related U.S. Application Data

(63) Continuation of application No. PCT/JP2018/020176, filed on May 25, 2018.

(30) Foreign Application Priority Data

May 29, 2017 (JP) .................................. 2017-105576

(51) Int. Cl.
*G02F 1/13363* (2006.01)
*G02F 1/1347* (2006.01)
(Continued)

(52) U.S. Cl.
CPC ........ *G02F 1/13363* (2013.01); *G02F 1/1323* (2013.01); *G02F 1/1347* (2013.01); *G02F 1/133528* (2013.01)

(58) Field of Classification Search
CPC ............. G02F 1/13363; G02F 2202/40; G02F 2001/133638; G02F 1/133528;
(Continued)

(56) References Cited

U.S. PATENT DOCUMENTS

2006/0066785 A1* 3/2006 Moriya ............. G02F 1/133634
349/117
2006/0158590 A1* 7/2006 Matsushima ....... G02F 1/13471
349/117
(Continued)

FOREIGN PATENT DOCUMENTS

JP 2004-279866 A 10/2004
JP 2007-178979 A 7/2007
(Continued)

OTHER PUBLICATIONS

International Preliminary, Report on Patentability (Forms PCT/IB/326, PCT/IB/373, PCT/ISA/237) and Written Opinion of the International Searching Authority, dated Dec. 12, 2019, for International Application No. PCT/JP2018/020176, with an English translation.
(Continued)

*Primary Examiner* — Jia X Pan
(74) *Attorney, Agent, or Firm* — Birch, Stewart, Kolasch & Birch, LLP

(57) ABSTRACT

A display device includes an image display panel, and a viewing angle switching element, in which the viewing angle switching element includes first and second linear polarizers arranged to face each other, and a viewing angle control cell and an optical compensation sheet arranged in a laminated manner between the first and second linear polarizers, the viewing angle control cell includes a single domain vertical alignment liquid crystal cell, an angle formed between an in-plane fast axis of the optical compensation sheet and the absorption axis or the reflection axis of the first linear polarizer is 30° to 60°, and a pretilt azimuth of the vertically aligned liquid crystal of the viewing angle control cell is at an angle of 30° to 60° from the absorption axis or the reflection axis of the first linear polarizer.

4 Claims, 4 Drawing Sheets

(51) Int. Cl.
*G02F 1/13* (2006.01)
*G02F 1/1335* (2006.01)

(58) Field of Classification Search
CPC .. G02F 1/13362; G02F 1/1323; G02F 1/1347; G02F 1/13471; G02B 5/3083; G02B 5/3033; G02B 5/3025; G02B 27/26; Y10T 428/1041
See application file for complete search history.

(56) References Cited

U.S. PATENT DOCUMENTS

| | | | | |
|---|---|---|---|---|
| 2008/0309858 | A1* | 12/2008 | Ojima | G02F 1/13363 349/106 |
| 2009/0128746 | A1* | 5/2009 | Kean | G02F 1/1323 349/96 |
| 2009/0174843 | A1* | 7/2009 | Sakai | G02F 1/13471 349/74 |
| 2010/0128200 | A1* | 5/2010 | Morishita | G02F 1/1323 349/62 |
| 2010/0197189 | A1 | 8/2010 | Jin et al. | |
| 2018/0196293 | A1* | 7/2018 | Fukuoka | G02B 30/25 |

FOREIGN PATENT DOCUMENTS

| | | |
|---|---|---|
| JP | 2008-310271 A | 12/2008 |
| JP | 2009-20293 A | 1/2009 |
| WO | WO 2007/094358 A1 | 8/2007 |

OTHER PUBLICATIONS

International Search Report (Form PCT/ISA/210), dated Jul. 17, 2018, for International Application No. PCT/JP2018/020176, with an English translation.

Japanese Office Action dated May 19, 2020, for Japanese Patent Application No. 2019-522195, with English translation.

* cited by examiner

DISPLAY DEVICE

CROSS-REFERENCE TO RELATED APPLICATIONS

This application is a continuation application of International Application No. PCT/JP2018/020176, filed May 25, 2018, the disclosure of which is incorporated herein by reference in its entirety. Further, this application claims priority from Japanese Patent Application No. 2017-105576, filed May 29, 2017, the disclosure of which is incorporated herein by reference in its entirety.

BACKGROUND OF THE INVENTION

1. Field of the Invention

The present disclosure relates to a display device such as a liquid crystal display device or an organic electroluminescent display device, and particularly relates to a display device capable of controlling a viewing angle.

2. Description of the Related Art

In electronic devices for personal use such as a tablet personal computer (PC), a laptop PC, and a mobile phone such as a smartphone, there is a demand for preventing a screen from being peeped by a peripheral third party. Therefore, in these electronic devices, the viewing angle of the screen is narrowed so that the screen is not to be peeped by a peripheral third party.

In addition, in information displays for public use, displays mounted on cars, trains and aircrafts, and industrial displays for medical and factory equipment and the like, there has been an increasing demand for widening a viewing angle in a certain direction and narrowing a viewing angle in a certain direction.

As a method of narrowing the viewing angle of a screen, a method of bonding a film in which black stripes are formed (louver film) or the like to a screen has been known.

However, in this method, the screen is fixed in a state in which the viewing angle of the screen is narrow. Therefore, for example, in a case where a screen is needed to be visually recognized in an oblique direction, such as a case where several persons visually recognize a screen, the visibility in the oblique direction is deteriorated and the usability of electronic devices is deteriorated.

In order to solve such problems, in electronic devices such as a tablet PC and a laptop PC, various display devices capable of switching between a display at a wide viewing angle and a display at a narrow viewing angle to realize security such as prevention of a peep from the side and if necessary, sufficient visibility from the side have been proposed.

For example, JP2007-178979A (hereinafter, also referred to as Patent Document 1) discloses a liquid crystal display device including a first substrate having gate wirings and data wirings corresponding to subpixels of red (R), green (G), blue (B), and white (W), a thin film transistor disposed at each crossing points of the gate wirings and the data wirings, a plate type first common electrode disposed in the subpixels of R, G, B, and W, a pixel electrode having a plurality of slits, connected to the thin film transistor and insulated from the first common electrode, a second substrate bonded to face the first substrate and including a liquid crystal layer in a space between the second substrate and the first substrate, and a plate type second common electrode formed on the second substrate so as to correspond to each W subpixel.

In this liquid crystal display device, in a case of a wide viewing angle display, the viewing angle can be widened by driving the W subpixel in a fringe field switching (FFS) mode like adjacent subpixels of R, G, and B, and the W luminance can also be compensated, and in a case of a narrow viewing angle display, the viewing angle can be narrowed by driving the W subpixel in an electrically controlled birefringence (ECB) mode forming a vertical electric field unlike subpixels adjacent to R, G, and B.

JP2004-279866A (hereinafter, also referred to as Patent Document 2) discloses a display device including a screen having a viewing angle limited in a one-dimensional direction, and image display switching means for switching between a personal view mode in which an erection direction of an image displayed on the screen is approximately orthogonal to the viewing angle limiting direction and a multi-view mode in which the erection direction of the image coincides with the viewing angle limiting direction.

That is, in this display device, depending on whether or not the viewing angle of the screen is limited in the one-dimensional direction by using a microprism sheet or the like, and the top and the bottom of the image are made to coincide with the viewing angle limiting direction by rotating the image by 90°, a wide viewing angle display and a narrow viewing angle display can be switched.

SUMMARY OF THE INVENTION

According to these display devices, display visual recognition in a state in which a peep of a third party from the side can be prevented and appropriate display visual recognition for several persons can be achieved with one display device by switching between a wide viewing angle display and a narrow viewing angle display.

However, in the display devices disclosed in Patent Documents 1 and 2, it is possible to perform switching between a wide viewing angle display and a narrow viewing angle display only in two directions, for example, in left and right directions. That is, in the method of the related art, it is difficult to switch the viewing angle only in one direction with a simple configuration.

An object of the present disclosure is to solve such problems of the related art and to provide a display device capable of performing switching between a wide viewing angle display and a narrow viewing angle display with a limited viewing angle only in a certain direction with a simple configuration.

A display device according to the present disclosure comprises: an image display panel; and a viewing angle switching element that is arranged on one surface of the image display panel, in which the viewing angle switching element comprises first and second linear polarizers arranged to face each other, and a viewing angle control cell and an optical compensation sheet arranged in a laminated manner between the first and second linear polarizers, the first and second linear polarizers are arranged such that absorption axes thereof or reflection axes thereof are parallel or orthogonal to each other, the viewing angle control cell comprises a single domain vertical alignment liquid crystal cell in which vertically aligned liquid crystals are tilted in one direction by voltage application, an angle formed between an in-plane fast axis of the optical compensation sheet and the absorption axis or the reflection axis of the first linear polarizer is 30° to 60°, and a pretilt azimuth of the vertically aligned liquid crystal of the viewing angle control cell is at an angle of 30° to 60° from the absorption axis or the reflection axis of the first linear polarizer.

In the above description, the expression "the absorption axis or the reflection axis" means an absorption axis in a case where the linear polarizer is an absorption type polarizer, and means a reflection axis in a case where the linear polarizer is a reflection type polarizer.

In the display device according to the present disclosure, in the viewing angle switching element, the absorption axes or the reflection axes of the first and second linear polarizers may be orthogonal to each other, and of two azimuths on the in-plane fast axis of the optical compensation sheet, an azimuth having a smaller absolute value in a case where retardations are compared at an oblique polar angle of 45° may be the same as the pretilt azimuth of the vertically aligned liquid crystal of the viewing angle control cell.

In the display device according to the present disclosure, in the viewing angle switching element, the absorption axes or the reflection axes of the first and second linear polarizers may be parallel to each other, and of two azimuths on the in-plane fast axis of the optical compensation sheet, an azimuth having a smaller absolute value in a case where retardations are compared at an oblique polar angle of 45° may be at 90° from the pretilt azimuth of the vertically aligned liquid crystal of the viewing angle control cell with the absorption axis or the reflection axis interposed therebetween.

In the display device according to the present disclosure, it is preferable that the optical compensation sheet comprises a discotic liquid crystal layer in which hybrid alignment in which an angle formed between a disc surface of a discotic liquid crystal molecule and a sheet film surface increases from one film surface to the other film surface is fixed.

In the display device according to the present disclosure, it is preferable that an angle formed between the in-plane fast axis of the optical compensation sheet and the absorption axis or the reflection axis of the first linear polarizer is 45°, and the pretilt azimuth of the vertically aligned liquid crystal of the viewing angle control cell is at an angle of 45° from the absorption axis or the reflection axis of the first linear polarizer.

In the display device according to the present disclosure, it is preferable that the image display panel comprises a liquid crystal cell for display, and two linear polarizers that are arranged to face to each other with the liquid crystal cell for display interposed therebetween, and one of the two linear polarizers functions as the first linear polarizer of the viewing angle switching element.

Since the display device according to the present disclosure comprises an image display panel, and a viewing angle switching element that is arranged on one surface of the image display panel, in which the viewing angle switching element comprises first and second linear polarizers arranged to face each other, and a viewing angle control cell and an optical compensation sheet arranged in a laminated manner between the first and second linear polarizers, the first and second linear polarizers are arranged such that absorption axes thereof or reflection axes thereof are parallel or orthogonal to each other, the viewing angle control cell comprises a single domain vertical alignment liquid crystal cell in which a vertically aligned liquid crystal is tilted in one direction when voltage is applied, an angle formed between an in-plane fast axis of the optical compensation sheet and the absorption axis or the reflection axis of the first linear polarizer is 30° to 60°, and a pretilt azimuth of the vertically aligned liquid crystal of the viewing angle control cell is at an angle of 30° to 60° from the absorption axis or the reflection axis of the first linear polarizer, it is possible to perform switching between a wide viewing angle display and a narrow viewing angle display only in a certain direction with a limited viewing angle with a simple configuration.

DESCRIPTION OF THE PREFERRED EMBODIMENTS

Figure 1:
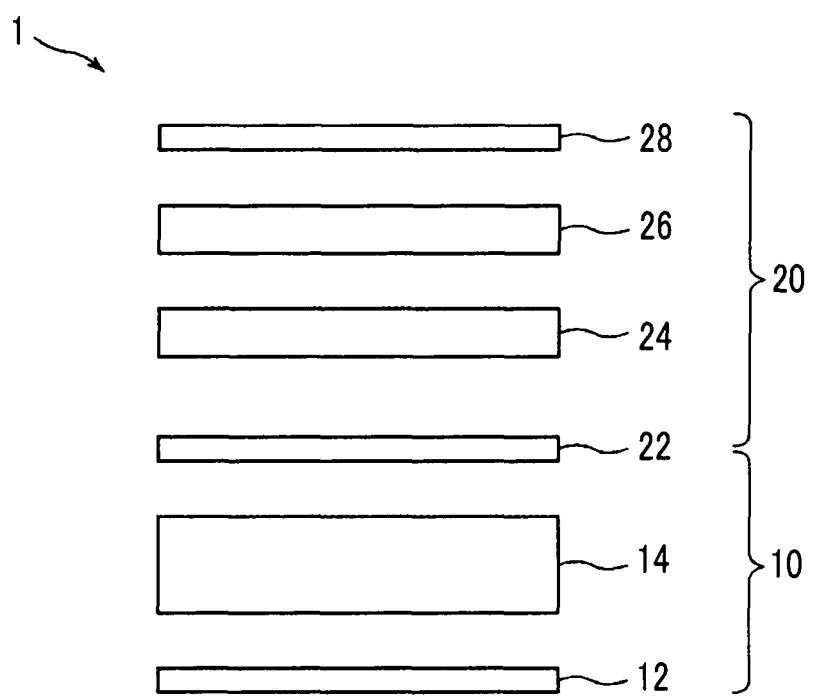
FIG. 1 is a view showing a schematic configuration of a display device according to an embodiment of the present invention.

Hereinafter, embodiments of a display device according to the present invention will be described with reference to drawings.

The numerical ranges expressed using "to" in the present specification include numerical values described before and after "to" as the lower limit value and the upper limit value. In addition, regarding the angle, the terms "orthogonal" and "parallel" means a range of accurate angle±10°.

A display device 1 according to a first embodiment comprises an image display panel 10, and a viewing angle switching element 20 that is arranged on one principal surface of the image display panel.

In the embodiment, the image display panel 10 is a liquid crystal display (LCD) and comprises two linear polarizers 12 and 22 of which the absorption axes or reflection axes are orthogonal to each other, and a liquid crystal cell for display 14 that is arranged between the pair of linear polarizers 12 and 22. The viewing angle switching element 20 comprises two linear polarizers 22 and 28 of which the absorption axes or reflection axes are orthogonal to each other, and a viewing angle control cell 24 and an optical compensation sheet 26 that are arranged between the two linear polarizers 22 and 28 in a laminated manner. In the embodiment, the linear polarizer 22 that is arranged on the visible side of the image display panel 10 functions as the first linearly polarizier of the viewing angle switching element 20. In the description of the viewing angle switching element 20 below, the linear polarizer 22 on the visible side of the image display panel 10 is referred to as a first linear polarizer 22. The linear polarizer 28 on the other side of the viewing angle switching element 20 is referred to as a second linear polarizer 28.

Hereinafter, a case where the linear polarizer is an absorption type polarizer will be described. In a case where a reflection type polarizer is used as the linear polarizer, the absorption axis may be replaced with a reflection axis and the same effect as in a case of an absorption type polarizer described later is exhibited.

Here, typically, the linear polarizer 22 is provided as a polarizing plate with a protective film on one surface or both surfaces of the linear polarizer. Hereinafter, the linear polarizer 22 may be replaced with a polarizing plate.

The viewing angle switching element 20 emits light from the liquid crystal cell for display 14 as linearly polarized light from the first linear polarizer 22 and the polarization change due to birefringence is given to the emitted linearly polarized light. In a case where the polarized light when reaching the second linear polarizer 28 is parallel to the transmission axis of the second linear polarizer 28, since the light is transmitted, the viewing angle is widened. In a case where the polarized light is vertical to the transmission axis, since the light is not transmitted, the viewing angle is narrowed. The viewing angle switching element 20 exhibits a function of giving a polarization change to change light to polarized light vertical to the transmission axis of the second linear polarizer 28 only in one direction by changing an applied voltage from an initial value (OFF state) to a predetermined value (ON state) in the viewing angle control cell and giving a change to change light to polarized light parallel to the transmission axis of the second linear polarizer 28 in directions other than the one direction. Here, the initial value of the applied voltage refers to a voltage value in a case where the viewing angle is a uniformly wide viewing angle when light passes through the viewing angle control cell 24 and is not limited to 0 V.

The viewing angle control cell 24 is formed of a single domain vertical alignment liquid crystal cell having negative dielectric anisotropy in which vertically aligned liquid crystals are tilted in one direction by voltage application. In the viewing angle control cell 24, when no voltage is applied, the rod-like liquid crystal molecules are approximately vertically aligned (for example, in the examples described later, the rod-like liquid crystal molecules are aligned at a pretilt angle of 89°), and when a voltage is applied, the long axes of the liquid crystal molecules are tilted uniformly in a direction of tilting of the pretilt angle (specific one direction). Thus, in a case where the applied voltage has the initial value, a similar change is caused or a similar change is not caused in all in-plane directions for the polarization of light passing through the viewing angle control cell 24. In addition, in a case where the applied voltage is changed from the initial value, for the polarization of light passing through the viewing angle control cell 24, a different polarization change can be caused only in a specific one direction from polarization changes in directions other than the specific one direction. In the present specification, the in-plane azimuth of the direction in which the liquid crystal molecules are tilted uniformly is referred to as a pretilt azimuth.

The absorption axis of the linear polarizer on the surface of an LCD of the related art is generally in the lateral direction (azimuthal angle 0° to 180°) or vertical direction (azimuthal angle 90° to 270°) of the screen in a case where the screen is viewed from the front. At this time, in a case where the pretilt azimuth of the viewing angle control cell 24 coincides with the lateral direction, the direction in which the liquid crystal molecules are tilted by voltage application is parallel or orthogonal to the absorption axis of the linear polarizer, and thus there is no change in the polarization of light passing therethrough. On the other hand, in the embodiment of the present invention, the pretilt azimuth of the viewing angle control cell 24 is set to the azimuth at an angle of 45° from the absorption axis of the first linear polarizer. However, since a difference between a polarization change in a predetermined direction and a polarization change in directions other than the predetermined direction is not sufficient only in the viewing angle control cell 24, the optical compensation sheet 26 comprising an optically anisotropic layer having optically asymmetric anisotropy in the azimuthal angle direction is arranged such that an angle formed between the in-plane fast axis and the absorption axis of the first linear polarizer 22 is approximately 45°. Therefore, the difference between the polarization change in the predetermined direction and the polarization change in the directions other than the predetermined direction can be made sufficient, and thus a viewing angle switch can be realized only in one specified direction.

Of two azimuths on the in-plane fast axis of the optical compensation sheet 26, an azimuth having a smaller absolute value in a case where retardations are compared at an oblique polar angle of 45° (hereinafter, referred to as an R azimuth) is preferably the same as the pretilt azimuth or at an angle of 90° from the pretilt azimuth with the absorption axis of the first linear polarizer 22 interposed therebetween.

In a case where the absorption axes of the first linear polarizer 22 and the second linear polarizer 28 are orthogonal to each other, at the initial value (OFF state) of the voltage applied to the viewing angle control cell 24, the viewing angle switching element 20 causes a polarization change to change the phase by 90° in all directions for the light passing through the viewing angle control cell 24 and the optical compensation sheet 26. On the other hand, at the predetermined value (ON state) of the voltage applied to the viewing angle control cell 24, almost no polarization change is caused in a predetermined direction for the passing light, and a polarization change to change the phase by 90° in directions other than the predetermined direction is caused.

In a case where the absorption axes of the first linear polarizer 22 and the second linear polarizer 28 are parallel to each other, at the initial value (OFF state) of the voltage applied to the viewing angle control cell 24, the viewing angle switching element 20 does not change the phase in all directions for the light passing through the viewing angle control cell 24 and the optical compensation sheet 26. On the other hand, at the predetermined value (ON state) of the voltage applied to the viewing angle control cell 24, a polarization change to change the phase by 90° in a predetermined direction for the passing light is caused and the phase is not changed in directions other than the predetermined direction.

The display device 1 can display an image with the viewing angle changed from a wide viewing angle to a narrow viewing angle only in one direction by the on and off control of the viewing angle switching element.

Figure 2:
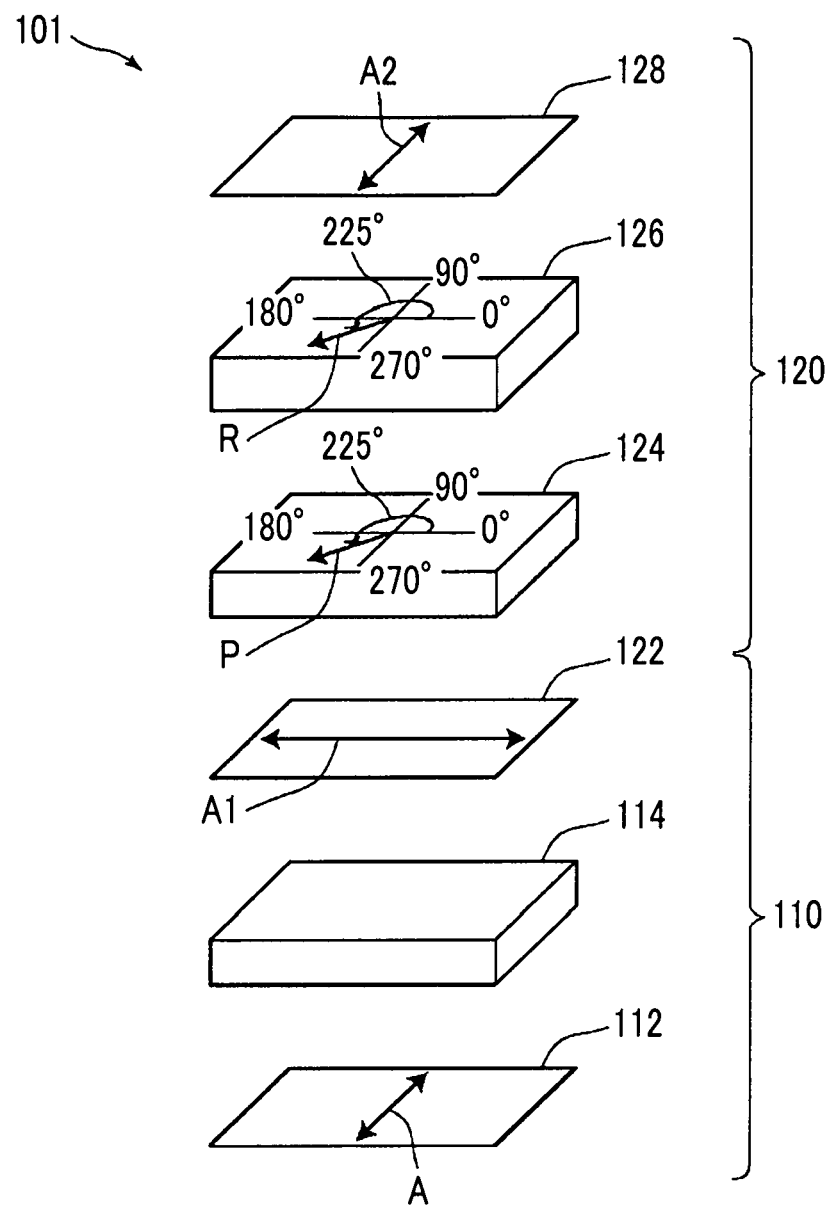
FIG. 2 is a perspective view showing a schematic configuration of a display device 101 of configuration example 1.
Figure 3:
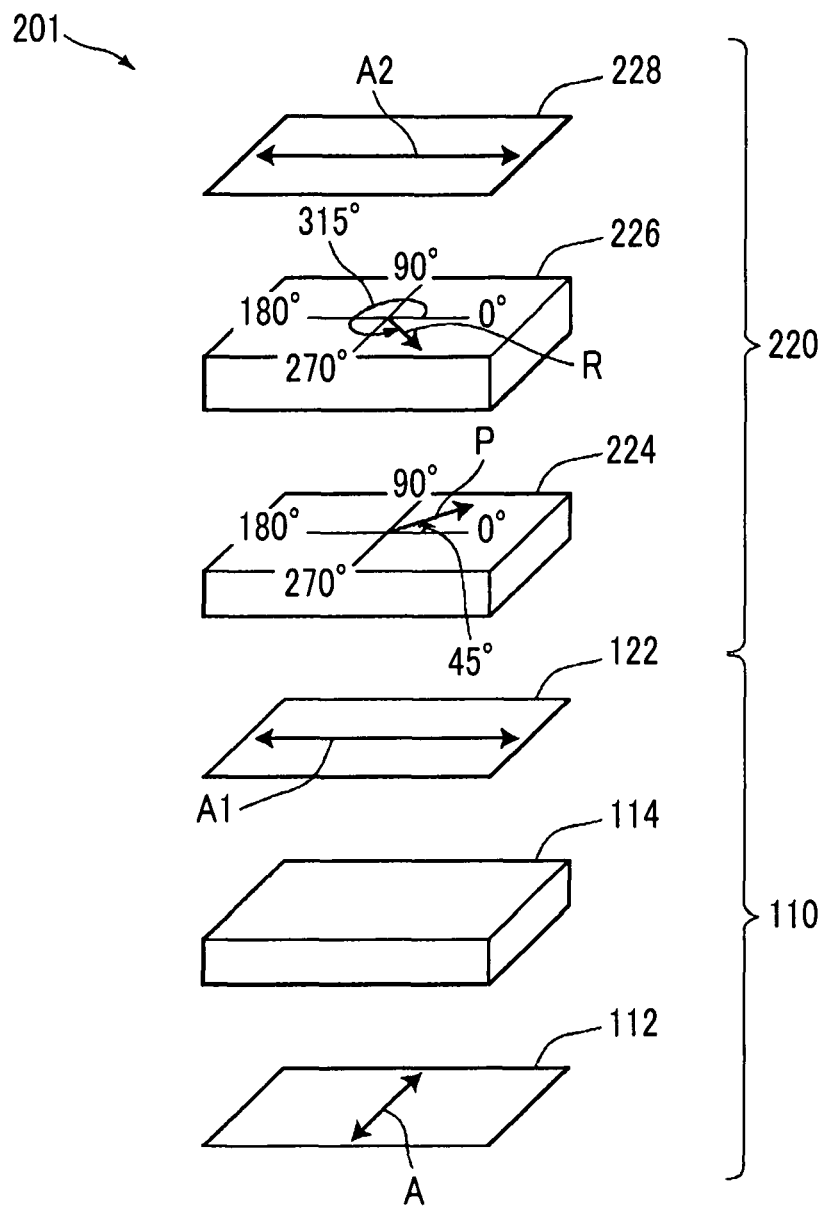
FIG. 3 is a perspective view showing a schematic configuration of a display device 201 of configuration example 2.

Hereinafter, more specific configuration examples of the display device according to the first embodiment will be described with reference to FIGS. 2 and 3. In FIGS. 2 and 3, the same components as the respective components of the display device according to the first embodiment are respectively denoted by the same reference numerals used in FIG. 1. In configuration example 1 shown in FIG. 2, reference numerals obtained by adding 100 are assigned and in configuration example 2 shown in FIG. 3, reference numerals obtained by adding 200 are assigned.

Configuration Example 1

FIG. 2 is a perspective view showing a schematic configuration of a display device 101 of configuration example 1.

In the display device 101 shown in FIG. 2, a first linear polarizer 122 and a second linear polarizer 128 are arranged such that the absorption axes A1 and A2 are orthogonal to each other. In the example, the right direction in the lateral direction in the drawing is defined as an azimuth of 0°, the left direction is defined as an azimuth of 180°, and an absorption axis A1 of the first linear polarizer 122 coincides with the lateral direction. At this time, the azimuth of the absorption axis A1 is 0° and also 180°.

Then, the pretilt azimuth of a viewing angle control cell 124 is 225° and is at an angle of 45° from the absorption axis A1 (an azimuth of 180°). In addition, an R azimuth of an optical compensation sheet 126 is also 225° and is at an angle of 45° from the absorption axis A1 (an azimuth of 180°).

In this configuration example 1, the viewing angle on the left direction (an azimuth of) 180° side in the drawing can be switched from a wide visual field to a narrow visual field. A wide visual field state is set to an OFF state and a narrow visual field state is set to an ON state.

In this configuration, when an image display panel 110 displays a white display and a large voltage (for example, 5 V) is applied to the viewing angle control cell 124, the liquid crystal molecules are horizontally tilted in the pretilt angle azimuth and the in-plane retardation is generated. Thus, the incidence polarized light is changed and turned into white in the front and all viewing angle directions, and the viewing angle control is set to an "OFF" state. In a case where the voltage is lowered from this state (for example, 3.4 V), the angle at which the liquid crystal molecules are tiled is decreased (the state of the liquid crystal molecules changes from a state in which the liquid crystal molecules are horizontally tilted to a state in which the liquid crystal molecules are erected), and the major axis direction of the liquid crystal molecules is obliquely tilted in the pretilt azimuth. Thus, the retardation is smaller in the pretilt azimuth than in other azimuths. In the direction where the retardation is small, the transmittance is lower than in other directions, the state becomes black, and the viewing angle control is an "ON" state. In configuration example 1, since a pretilt azimuth P of the viewing angle control cell is set to 225°, the transmittance change is the largest at an azimuth of 225°. However, in order to increase the transmittance change in the left direction of the screen (azimuth 180° direction), an optically anisotropic layer (optical compensation sheet 126) having optical anisotropy with an asymmetrical retardation in the axial direction including the R azimuth is arranged such that the R azimuth is 225°, and thus the oblique retardation is adjusted.

Configuration Example 2

FIG. 3 is a perspective view showing a schematic configuration of a display device 201 of configuration example 2.

In the display device 201 in FIG. 3, the first linear polarizer 122 and the second linear polarizer 128 are arranged such that the absorption axes A1 and A2 are parallel to each other. In the example, the right direction in the lateral direction in the drawing is defined as an azimuth of 0°, the left direction is defined as an azimuth of 180°, and the absorption axis A1 of the first linear polarizer 122 coincides with the lateral direction. At this time, the azimuth of the absorption axis A1 is 0° and also 180°.

The pretilt azimuth of the viewing angle control cell 224 is 45° and is at an angle of 45° from the absorption axis A1 (an azimuth of 0°). In addition, the R azimuth of the optical compensation sheet 226 is 315° and is at an angle of 45° from the absorption axis A1 (an azimuth of 0°).

In this configuration example 2, the viewing angle on the left direction (an azimuth of) 180° side in the drawing can be switched from a wide view filed (OFF state) to a narrow view field (ON state).

In this configuration, when the image display panel 110 displays a white display, since the liquid crystal molecules in the viewing angle control cell 224 are approximately vertically aligned at non-voltage application (0 V), there is no retardation in the front and the retardation is small even in the oblique direction. Thus, the front and all viewing angle directions are in a white state and the viewing angle control is an "OFF" state. In a case where the voltage is increased from this state (for example, 3.0 V), since the liquid crystal molecules are tilted in the pretilt azimuth and the major axis direction of the liquid crystal molecules is tilted obliquely, the retardation is larger in the pretilt azimuth and the opposite azimuth than in other azimuths. In the direction where the retardation is large, the transmittance is lower than in the other directions, resulting in a black state, and the viewing angle control is an "ON" state. In configuration example 2, since the pretilt azimuth P of the viewing angle control cell is at 45°, the transmittance change is the largest at an azimuth of 225°. However, in order to increase the transmittance change in the left direction of the screen (azimuth 180° direction), an optically anisotropic layer (optical compensation sheet 226) having optical anisotropy with an asymmetrical retardation in the azimuthal angle direction including the R azimuth is arranged such that the R azimuth is 315°, and thus the oblique retardation is adjusted. The configuration example 2 is different from the configuration example 1, and the pretilt azimuth of the liquid crystal cell for display and the R azimuth of the optically anisotropic layer are orthogonal to each other. The difference between the two configuration examples is related to the fact that in configuration example 1, the first and second linear polarizers are arranged such that the absorption axes are orthogonal to each other, whereas in configuration example 2, the first and second linear polarizers are arranged such that the absorption axes are parallel to each other.

In the embodiment, the angle formed between the in-plane fast axis of the optical compensation sheet and the absorption axis of the first linear polarizer is 45°, and the pretilt azimuth of the vertically aligned liquid crystal of the viewing angle control cell is at an angle of 45° from the absorption axis of the first linear polarizer. However, these angles may be appropriately set within a range of 30° to 60°. As in configuration examples 1 and 2 described above, in a case where the viewing angle of the left direction (an azimuth of 180°) of the screen is controlled, 45° is suitable as the angle, but in order to control the viewing angle from a direction shifted from the right lateral direction such as an azimuth of 160° or the like, an angle shifted from 45° is suitable. Thus, these angles may be adjusted according to the desired viewing angle control azimuth.

Figure 4:
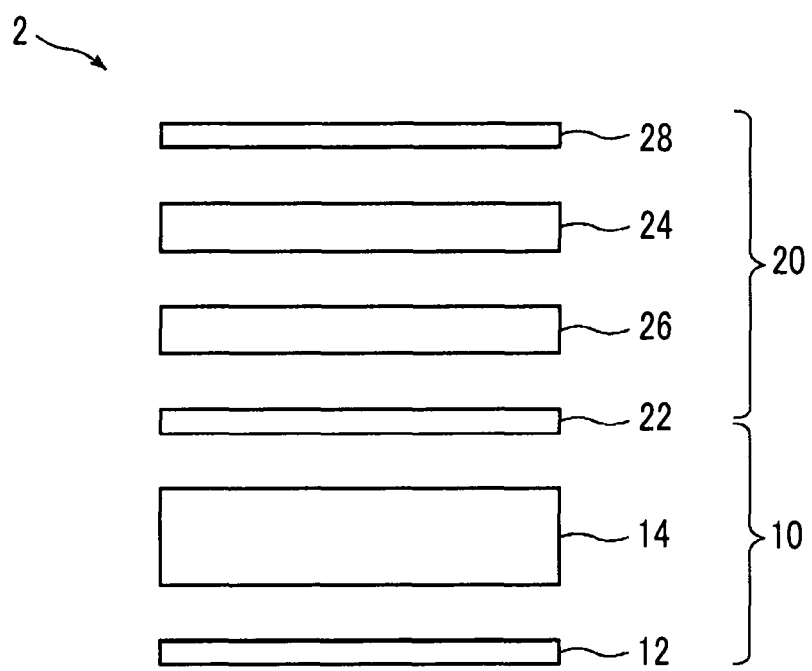
FIG. 4 is a view showing a schematic configuration of a display device of a design change example.

In the embodiment, the configuration in which the viewing angle switching element comprises the viewing angle control cell on the first linear polarizer side and the optical compensation sheet on the second linear polarizer has been described. However, the arrangement of the viewing angle control cell 24 and the optical compensation sheet 26 may be reversed. That is, as shown in FIG. 4, the display device 2 comprising the optical compensation sheet 26 on the first linear polarizer 22 side and the viewing angle control cell on the second linear polarizer 28 side may be adopted.

Figure 5:
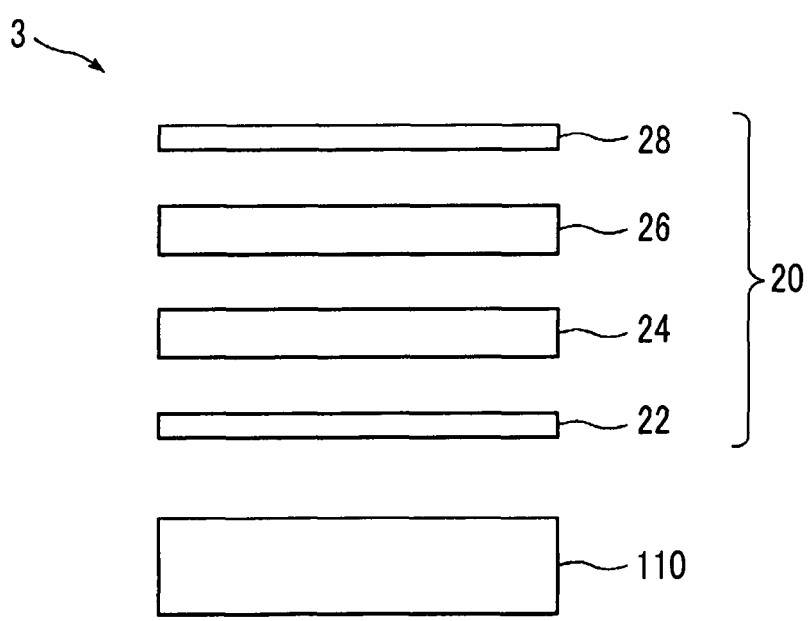
FIG. 5 is a view showing a schematic configuration of a display device of another design change example.

In the embodiment, the case where the image display panel is a liquid crystal panel has been described. However, the image display panel is not limited to a liquid crystal panel and may be an organic light emitting diode (OLED) or a printed material. In a case where the image display panel is an OLED or a printed material, since there is no linear polarizer on the light emitting surface, the viewing angle switching element 20 may have the first linear polarizer 5 independent of the image display panel. That is, as shown in FIG. 5, a display element according to an embodiment of the present invention may be a display device 3 comprising a viewing angle switching element 20 comprising a first linear polarizer, a viewing angle control cell 24, an optical compensation sheet, and a second linear polarizer on a light emitting surface side of an OLED 110.

In the embodiment, the configuration in which the display device comprises the viewing angle switching element 20 on the visible side of the display panel has been described, but in a case where the image display panel is an LCD, the viewing angle switching element may be provided on the side opposite to the visible side of the image display panel, that is, on the LCD backlight side. Even in a case where the viewing angle switching element 20 is provided on any surface side of the display panel, the same effect as the above configuration can be obtained.

In addition, in the embodiment, the first and second linear polarizers have described as absorption type polarizers. However, either or both of the first and second linear polarizers may be a reflection type polarizer. One may be an absorption type polarizer, and the other may be a reflection type polarizer. In addition, at least one of the linear polarizers may have a laminated structure of an absorption type polarizer and a reflection type polarizer. A reflection type polarizer is suitably used when light is recycled. In the case where the image display panel is an LCD, the viewing angle switching element may be arranged on the side opposite to the visible side of the image display panel, the second linear polarizer may be a reflection type polarizer, and the first linear polarizer may be a lamination type of a reflection type polarizer and an absorption type polarizer. By adopting such a configuration, it is possible to achieve both backlight light recycling and image display panel display quality (contrast and the like).

As the optical compensation sheet used in the embodiment of the present invention, for example, an optical compensation sheet comprising a discotic liquid crystal layer in which the discotic liquid crystal molecules are aligned and fixed in a hybrid alignment state in which an angle formed between the disc surface and the sheet film surface increases from one film surface to the other film surface can be suitably used. Specifically, it is preferable to use the optical compensation sheet described in JP2004-354962A or JP2005-206638A.

As the optical compensation sheet comprising an optically anisotropic layer, the optical compensation sheet described in JP2004-354962A is preferably used. However, as long as the R azimuth has the same direction, even in a case where a plurality of layers (for example, 2 layers) are overlapped and used, the same effect according to the embodiment of the present invention can be obtained.

In addition, the optical compensation sheet used in JP2004-354962A includes a support and an optically anisotropic layer formed of a liquid crystalline material. However, as long as the R azimuth has the same direction, the support side surface may be arranged on the viewing angle control cell side or on the liquid crystal cell for display side.

As the linear polarizer used in the embodiment of the present invention, a known linear polarizer can be used and for example, a polyvinyl alcohol (PVA) iodine polarizer may be used. However, there is no limitation thereto.

EXAMPLES

Example 1

<Preparation of Viewing Angle Control Cell>

To two glass substrates with indium tin oxide (ITO) electrodes having a thickness of 0.7 mm were prepared and on the ITO surface side, a vertical alignment material for liquid crystals SE-1211 (manufactured by Nissan Chemical Industries Ltd.) was applied and fired by heating to form an alignment film. Then, an alignment treatment by rubbing was performed. Thereafter, the alignment films of the two substrates faced to each other and overlapped through a spacer so that the alignment treatment directions were antiparallel, thereby preparing a cell. A liquid crystal material with negative dielectric anisotropy MLC-2039 (manufactured by Merck) was injected into this cell to produce a viewing angle control cell.

As a result of measuring the $\Delta nd$, which is birefringence, and the pretilt angle of the viewing angle control cell using Axoscan manufactured by Axometrics Inc., it was confirmed that $\Delta nd$ was 330 nm, the pretilt angle was 89°, and the viewing angle control cell was an almost vertical alignment cell. In addition, the transmittance in a case where this cell was interposed between crossed Nicol polarizers and a voltage was applied was examined. In a case where no voltage was applied, it was confirmed that the front transmittance was approximately zero, but the transmittance increased as the voltage increased. In addition, it was confirmed that the transmittance in the in-plane azimuth of the pretilt angle was smaller than that in the in-plane azimuth that was 180 degrees different from the pretilt angle, and the liquid crystals were tilted in a single direction in a case where a voltage was applied. The direction in which the liquid crystals are tilted is a pretilt azimuth.

<Preparation of Polarizing Plate>

A linear polarizer formed of a polyvinyl alcohol film was prepared by adsorbing iodine onto a stretched polyvinyl alcohol film. The polarization degree was 99.997. Next, a commercially available cellulose triacetate film (FUJITAC TD80UF, manufactured by Fujifilm Corporation) was saponified in the same manner and bonded to the other surface of the linear polarizer using a polyvinyl alcohol-based adhesive as a protective film, and thus a polarizing plate was prepared.

<Preparation of Optical Compensation Sheet>

An optical compensation sheet was prepared according to the production method described in Example 1 of JP2004-354962A. An azimuth in which the birefringence became lowest on the in-plane fast axis or in the plane of the optically anisotropic layer in the optical compensation sheet, that is, of two azimuths on the in-plane fast axis, an azimuth having a smaller absolute value in a case where retardations are compared at an oblique polar angle of 45° (R azimuth) was specified by Axoscan manufactured by Axometrics Inc.

<Preparation of Viewing Angle Switching Control Device>

A liquid crystal monitor LP2065 manufactured by Hewlett Packard Enterprise Company was prepared as an image display panel. This liquid crystal monitor includes a backlight side polarizing plate, a liquid crystal cell for display, and a visible side polarizing plate, the absorption axis azimuth of the visible side polarizing plate is the lateral direction of the image display panel, and the absorption axis azimuth of the backlight side polarizing plate is the vertical direction of the image display panel. A display device of Example 1 in which the viewing angle control cell, the optical compensation sheet, and the linearly polarizing plate were laminated on the visible side polarizer of the liquid crystal monitor in this order using a pressure sensitive adhesive (SK Dyne 2057 manufactured by Soken Chemical & Engineering Co., Ltd.), and the viewing angle switching element was provided was prepared. At this time, the absorption axis of the linearly polarizing plate was arranged in a direction orthogonal to the absorption axis of the visible side polarizer of the liquid crystal monitor.

The support surface of the optically anisotropic layer was laminated so as to face the viewing angle control cell. The azimuth of another member from the azimuth of the control cell and the optically anisotropic layer was generally determined based on Table 1. The display device of Example 1 has a lamination structure shown in FIG. 2.

and the right direction (an azimuth of 0°) and in a narrow viewing angle state (ON state) only in the left direction while leaving the wide viewing angle state in the right direction in the viewing angle control cell, the display brightness was visually evaluated from three directions of a front direction (normal N direction), a right direction (an azimuthal angle of 0°) and a 45° direction (a polar angle of 45°) with respect to the normal line N, and a left direction (an azimuthal angle of 180°) and a 45° direction (a polar angle of 45°) with respect to the normal line N. The voltages applied in the OFF state and the ON state were as shown in Table 1 respectively.

The evaluation is as follows.
A: The brightness is bright and the display is not visible.
B: The brightness is slightly dark but the display is visible.
S: The brightness is dark and the display is not visible.

TABLE 1

| | | | Comparative Example 1 | Example 1 | Comparative Example 2 | Example 2 |
|---|---|---|---|---|---|---|
| Viewing angle switching element configuration | Absorption axis of second linearly polarizing plate | | 90° | 90° | 0° | 0° |
| | R azimuth of optically anisotropic layer | | None | 225° | None | 315° |
| | Pretilt azimuth of viewing angle control cell | | 225° | 225° | 45° | 45° |
| | Voltage applied in OFF state of viewing angle control cell | | 5 V | 5 V | 0 V | 0 V |
| | Voltage applied in ON state of viewing angle control cell | | 3.4 V | 3.4 V | 3.0 V | 3.0 V |
| | Absorption axis of first linearly polarizing plate | | 0° (180°) | 0° (180°) | 0° | 0° |
| Effect | Front | OFF | A | A | A | A |
| | | ON | A | A | A | A |
| | Right (azimuthal angle 0°) polar angle 45° | OFF | A | A | A | A |
| | | ON | A | A | A | A |
| | Left (azimuthal angle 0°) polar angle 45° | OFF | A | A | A | A |
| | | ON | B | S | B | S |

Comparative Example 1

A display device having a configuration in which the optical compensation sheet was excluded in Example 1 was prepared as Comparative Example 1.

Example 2

A viewing angle control cell, a polarizing plate, and an optical compensation sheet were prepared in the same manner as in Example 1 and a liquid crystal monitor LP2065 manufactured by Hewlett Packard Enterprise Company was prepared as an image display panel. In addition, A display device of Example 2 in which as in Example 1, the viewing angle control cell, the optical compensation sheet, and the linearly polarizing plate were laminated in this order on the visible side polarizer of the liquid crystal monitor using a pressure sensitive adhesive (SK Dyne 2057 manufactured by Soken Chemical & Engineering Co., Ltd.), and the viewing angle switching element was provided was prepared. At this time, the absorption axis of the linearly polarizing plate was parallel to the absorption axis of the visible side polarizer of the liquid crystal monitor. The display device of Example 2 has a lamination structure shown in FIG. 3.

Comparative Example 2

A display device having a configuration in which the optical compensation sheet was excluded in Example 2 was prepared as Comparative Example 2.

[Evaluation]

Regarding each prepared device, a test image was displayed on the image display cell, in a wide viewing angle state (OFF state) in the left direction (an azimuth of 180°)

As shown in Table 1, it is found that in Examples 1 and 2, the brightness from the left direction at the time of ON was low compared to Comparative Examples 1 and 2, and the viewing angle could be switched only in the left direction. Thus, the effect of the embodiment of the present invention was clarified.

The embodiment of the present invention can be suitably used as a display device for a tablet PC, a laptop PC, and a smartphone, an information display for public use, a display to be mounted on a car, a train and an aircraft, and an industrial display for medical and factory equipment.

The entire disclosure of Japanese Patent Application No. 2017-105576 field on May 29, 2017 is hereby incorporated herein by reference.

All documents, patent applications, and technical standards described herein are incorporated herein by references to the same extent as a case in which incorporation of the individual reference documents, patent applications, and technical standards by references are described specifically and individually.

What is claimed is:

1. A display device comprising:
an image display panel; and
a viewing angle switching element that is arranged on one surface of the image display panel,
wherein the viewing angle switching element comprises first and second linear polarizers arranged to face each other, and a viewing angle control cell and an optical compensation sheet arranged in a laminated manner between the first and second linear polarizers,
the first and second linear polarizers are arranged such that absorption axes thereof or reflection axes thereof are parallel or orthogonal to each other, the viewing angle control cell comprises a single domain vertical alignment liquid crystal cell in which vertically aligned liquid crystals are tilted in one direction by voltage application, an angle formed between an in-plane fast axis of the optical compensation sheet and the absorption axis or the reflection axis of the first linear polarizer is 30° to 60°, a pretilt azimuth of the vertically aligned liquid crystal of the viewing angle control cell is at an angle of 30° to 60° from the absorption axis or the reflection axis of the first linear polarizer, wherein in the viewing angle switching element, the absorption axes or the reflection axes of the first and second linear polarizers are parallel to each other, and of two azimuths on the in-plane fast axis of the optical compensation sheet, an azimuth having a smaller absolute value in a case where retardations are compared at an oblique polar angle of 45° is at 90° from the pretilt azimuth of the vertically aligned liquid crystal of the viewing angle control cell with the absorption axis or the reflection axis interposed therebetween.

2. The display device according to claim 1, wherein the optical compensation sheet comprises a discotic liquid crystal layer in which hybrid alignment in which an angle formed between a disc surface of a discotic liquid crystal molecule and a sheet film surface increases from one film surface to the other film surface is fixed.

3. The display device according to claim 1, wherein an angle formed between the in-plane fast axis of the optical compensation sheet and the absorption axis or the reflection axis of the first linear polarizer is 45°, and the pretilt azimuth of the vertically aligned liquid crystal of the viewing angle control cell is at an angle of 45° from the absorption axis or the reflection axis of the first linear polarizer.

4. The display device according to claim 1, wherein the image display panel comprises a liquid crystal cell for display, and two linear polarizers that are arranged to face to each other with the liquid crystal cell for display interposed therebetween, and one of the two linear polarizers functions as the first linear polarizer of the viewing angle switching element.

* * * * *